(12) United States Patent
Erlenbeck et al.

(10) Patent No.: US 12,145,572 B2
(45) Date of Patent: Nov. 19, 2024

(54) SYSTEM AND METHOD TO DETERMINE SECOND ECU STATE USING SHARED SENSOR IN A DUAL ECU SYSTEM

(71) Applicant: Steering Solutions IP Holding Corporation, Saginaw, MI (US)

(72) Inventors: Jason M. Erlenbeck, Hemlock, MI (US); Rashmi Girmal, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 95 days.

(21) Appl. No.: 17/705,681

(22) Filed: Mar. 28, 2022

(65) Prior Publication Data

US 2022/0324434 A1    Oct. 13, 2022

Related U.S. Application Data

(60) Provisional application No. 63/172,958, filed on Apr. 9, 2021.

(51) Int. Cl.
*B60W 20/40*    (2016.01)
*H04L 12/40*    (2006.01)

(52) U.S. Cl.
CPC .............. *B60W 20/40* (2013.01); *H04L 12/40* (2013.01); *H04L 2012/40215* (2013.01); *H04L 2012/40273* (2013.01)

(58) Field of Classification Search
CPC ................... B60W 20/40; H04L 12/40; H04L 2012/40215; H04L 2012/40273; B60R 16/0231; G06F 9/22
USPC ......................................................... 701/22
See application file for complete search history.

(56) References Cited

U.S. PATENT DOCUMENTS

| | | | | |
|---|---|---|---|---|
| 10,865,726 | B2* | 12/2020 | Zadpour | ............. F02D 41/3082 |
| 2018/0091290 | A1* | 3/2018 | Li | ......................... H04L 7/0331 |
| 2018/0267535 | A1* | 9/2018 | Robert | .............. B60W 60/0053 |
| 2020/0062301 | A1* | 2/2020 | Farrelly | ................ B62D 5/0409 |

* cited by examiner

*Primary Examiner* — Yi-Kai Wang

(57) ABSTRACT

Technical solutions are described for a system and method for determining status of an electronic control unit (ECU) in a dual-ECU system. The method includes: determining, by a first ECU, a pin state of an communications terminal connected to a sensor; powering the sensor by a second ECU; and determining, by the first ECU, a status of the second ECU based on the pin state of the communications terminal. The first ECU may determine the second ECU as being nonresponsive via a communications interface, and the first ECU may determine the status of the second ECU in response to determining the second ECU being nonresponsive via the communications interface. The first ECU may determine the status second ECU as being one of powered-on and non-responsive, powered-on and functioning, or powered-off, based on the pin state of the communications terminal.

20 Claims, 6 Drawing Sheets

SYSTEM AND METHOD TO DETERMINE SECOND ECU STATE USING SHARED SENSOR IN A DUAL ECU SYSTEM

CROSS-REFERENCES TO RELATED APPLICATIONS

This patent application claims priority to U.S. Provisional Patent Application Ser. No. 63/172,958, filed Apr. 9, 2021, which is incorporated herein by reference in its entirety.

BACKGROUND

The present application is generally related to methods and systems for determining a state of a secondary electronic control unit (ECU) in a dual ECU system.

In dual ECU systems, Inter-Microcontroller Communication (IMC) is commonly used by one ECU to determine a state of the other ECU. If a second ECU in the dual ECU system stops working, IMC signals will reflect a failure status on the first ECU, indicating that the second ECU may have stopped functioning. However, IMC may fail itself while the second ECU is still functioning. In such cases, it can be difficult for the first ECU to determine the state of the second ECU, since the IMC failure does not provide sufficient information to distinguish between a communication fault and an ECU failure.

In some dual ECU systems, one or more sensor signals may be shared between two ECUs. A sensor signal may be powered by the second ECU and read by both the primary and second ECUs.

SUMMARY

An aspect of the disclosed embodiments includes a method of determining status of an electronic control unit (ECU) in a dual-ECU system. The method includes: determining, by a first ECU, a pin state of an communications terminal connected to a sensor; powering the sensor by a second ECU; and determining, by the first ECU, a status of the second ECU based on the pin state of the communications terminal.

An aspect of the disclosed embodiments includes a method of determining status of an electronic control unit (ECU) in a dual-ECU system. The method includes: powering a sensor by a second ECU; determining, by a first ECU, the second ECU being nonresponsive via a communications interface; determining, by the first ECU and in response to determining the second ECU being nonresponsive, a sensor signal protocol data based on an communications terminal connected to a sensor; determining, by the first ECU, if the sensor signal protocol data passes a protocol check; determining, by the first ECU and in response to determining the sensor signal protocol data not passing the protocol check, a pin state of the communications terminal; and determining, by the first ECU and in response to determining the sensor signal protocol data not passing the protocol check, a status of the second ECU based on the pin state of the communications terminal. The pin state includes at least one of the communications terminal remaining at a given logic level condition for a predetermined period of time or the communications terminal toggling between a logic level high condition and a logic level low condition by not remaining at a given one of the logic level high condition or the logic level low condition for the predetermined period of time. Determining the status of the second ECU includes determining the status of the second ECU as powered-on and functioning in response to determining the pin state of the communications terminal toggling between the logic level high condition and the logic level low condition. Determining the status of the second ECU includes determining the status of the second ECU as powered-on and non-responsive in response to determining the pin state of the communications terminal remaining at the logic level high condition for a first predetermined period of time. Each of the first ECU and the second ECU are configured to communicate with the sensor using a Single Edge Nibble Transmission (SENT) protocol. Determining the status of the second ECU includes determining the status of the second ECU as powered-off in response to determining the pin state of the communications terminal remaining at the logic level low condition for a second predetermined period of time. The method further includes: performing, by the first ECU, a first control action in response to determining the status of the second ECU as powered-on and non-responsive, the first control action including, at least, initializing communications with the sensor; and performing, by the first ECU, a second control action in response to determining the status of the second ECU as powered-off, wherein the second control action includes, at least, providing power to the sensor and initializing communications with the sensor.

An aspect of the disclosed embodiments includes a system for determining status of an electronic control unit (ECU) in a dual-ECU system. The system includes: a sensor having a sensor output pin; and a first ECU having a first communications terminal in electrical communication with the sensor output pin. The first ECU is configured to read sensor data from the sensor based on a pin state of the first communications terminal. The system also includes a second ECU having a second communications terminal in electrical communication with the sensor output pin. The second ECU is configured to read the sensor data from the sensor based on a pin state of the second communications terminal. The second ECU provides power to a sensor power rail and biasing a voltage of the first communications terminal and the second communications terminal to a logic level high condition. The first ECU is configured to determine a status of the second ECU based on the pin state of the first communications terminal.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A system and method are provided to utilize a shared sensor signal between primary and second ECUs to determine a state of health of the second ECU. The system and method of the present disclosure may provide information regarding the state of health of the second ECU, even in cases when Inter-Microcontroller Communication (IMC) between the primary and second ECUs fails or becomes unavailable.

The system and method of the present disclosure can determine a state of health of the second ECU based on sensor signals shared between the two ECUs. It provides a way to determine the other ECU's state in the event of an IMC failure, when IMC data cannot be used to determine other ECU's status. Based on the signature of the protocol that the sensor signals use, various operational states of the ECU can be determined.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

As described, a vehicle, such as a car, truck, sport utility vehicle, crossover, mini-van, marine craft, aircraft, all-terrain vehicle, recreational vehicle, or other suitable vehicles, typically includes one or more electronic control units (ECUs). For example, the vehicle may include one or more ECUs to control various aspects of a steering system of the vehicle. One or more systems within the vehicle may use a dual ECU system including two ECUs for redundancy.

Figure 1:
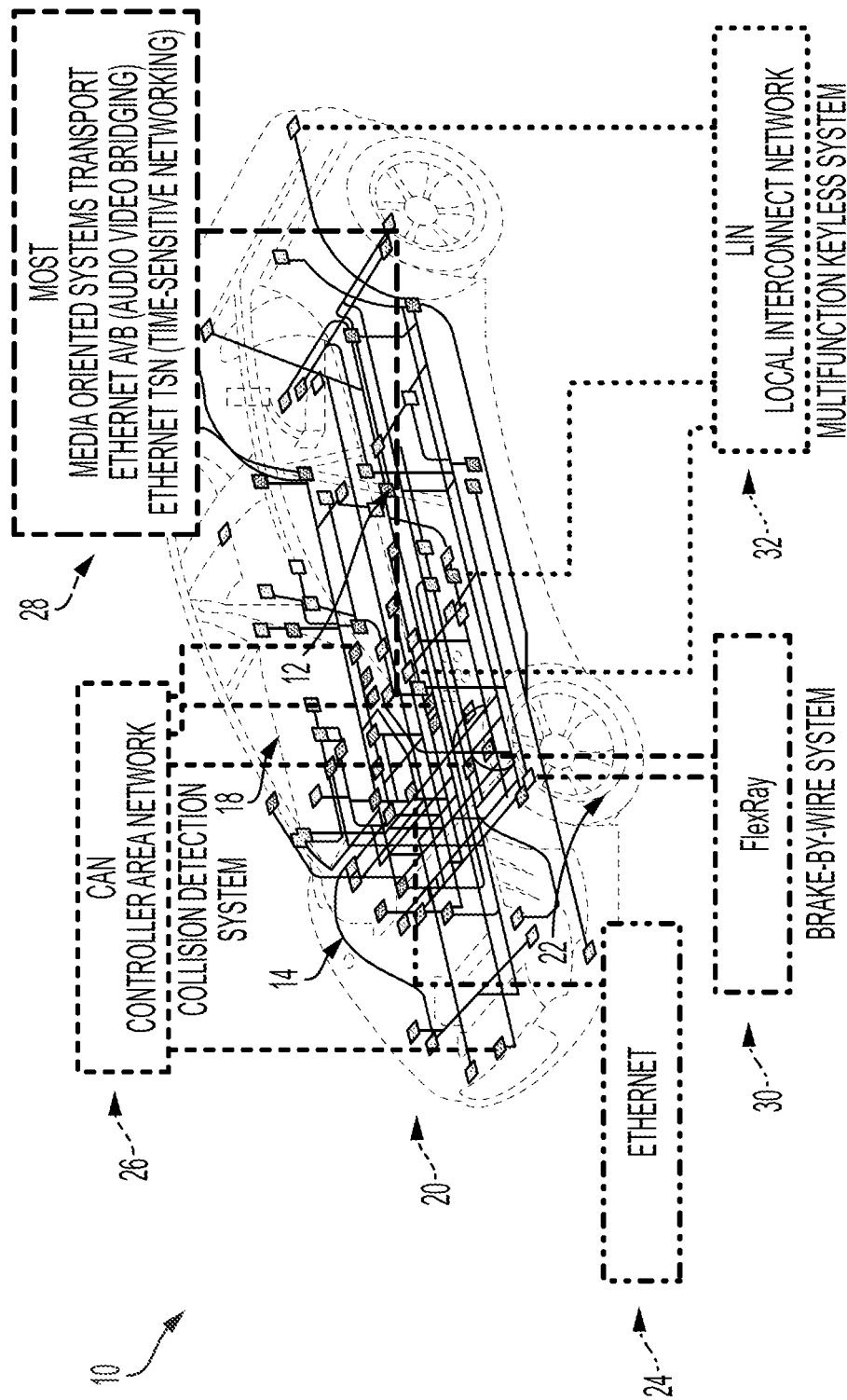
FIG. 1 generally illustrates a vehicle according to the principles of the present disclosure.

Referring now to the figures, where the technical solutions will be described with reference to specific embodiments, without limiting same, FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semiautonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
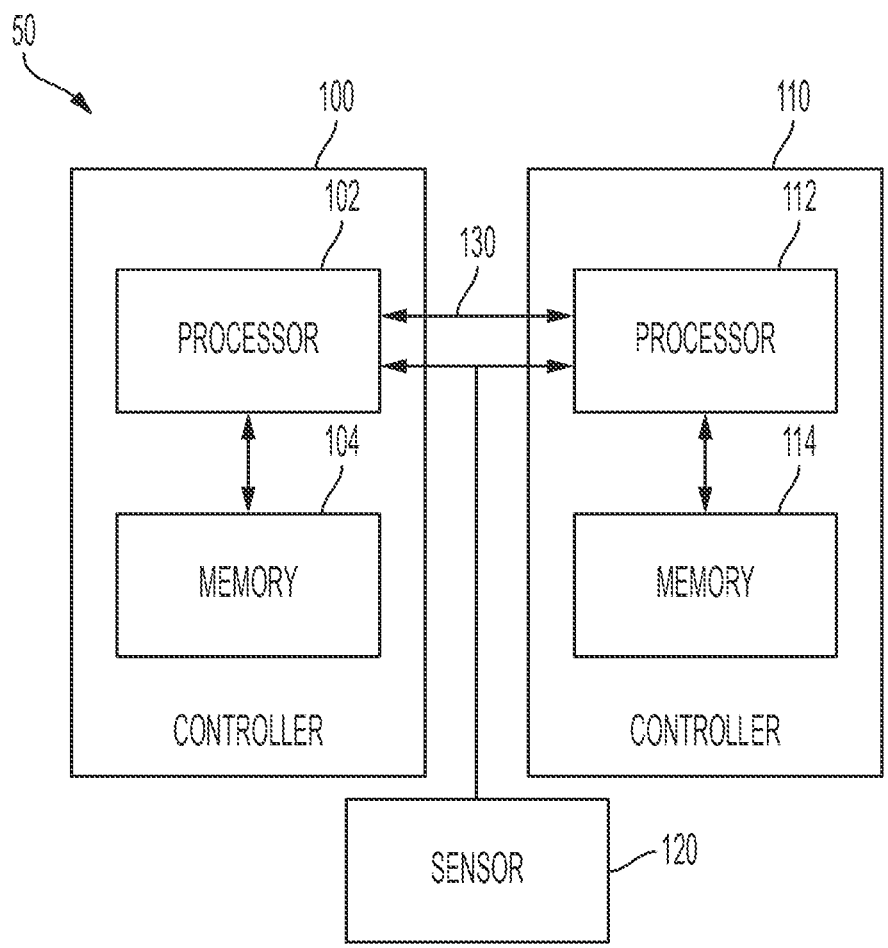
FIG. 2 shows a block diagram generally illustrating a dual electronic control unit (ECU) configuration according to the principles of the present disclosure.

In some embodiments, the vehicle 10 may include one or more controllers or electronic control units (ECUs). The ECUs may also be called controllers. As is generally illustrated in FIG. 2, a control system 50 within the vehicle includes a first ECU 100 and a second ECU 110, each connected to a sensor 120. The sensor 120 may be referred to as a common sensor or a shared sensor as a result of it being connected to two or more of the ECUs 100, 110. Each of the first ECU 100 and the second ECU 110 may include any suitable controller. The first ECU 100 may be called a primary ECU or a primary controller, and the second ECU 110 may be called a secondary ECU or secondary controller. The control system 50 may be configured to control, for example, various aspects of the vehicle 10, such as aspect of an electronic power steering system and/or other features or components of the vehicle 10. The first ECU 100 may include a first processor 102 and a first memory 104. The second ECU 110 may include a second processor 112 and a second memory 114.

Each of the processors 102, 112 may include any suitable processor, such as those described herein. Additionally, or alternatively, either or both of the first ECU 100 and/or the second ECU 110 may include any suitable number of processors, in addition to or other than the first and second processors 102, 112. Each of the memories 104, 114 may comprise a single disk or a plurality of disks (e.g., hard drives), and includes a storage management module that manages one or more partitions within the memories 104, 114. In some embodiments, either or both of the memories 104, 114 may include flash memory, semiconductor (solid state) memory or the like. The either or both of the memories 104, 114 may include Random Access Memory (RAM), a Read-Only Memory (ROM), or a combination thereof. The either or both of the memories 104, 114 may include instructions that, when executed by the corresponding processor 102, 112 cause the corresponding processor 102, 112 to, at least, control various functions of the vehicle 10.

As also shown in FIG. 2, the control system 50 includes a communications interface 130 between the first ECU 100 and the second ECU 110. The communications interface 130 providing the Inter-Microcontroller Communication (IMC) between the first ECU 100 and the second ECU 110. In some embodiments, the communications interface 130 may include a serial peripheral interface (SPI) and/or an Inter-Integrated Circuit (I2C) interface. However, any type of communications protocol and/or interface may be used. In some embodiments, one or more other controllers (not shown) may also be connected to the communications interface 130. For example, the communications interface 130 may include part of a communications network. Such a communications network may include, for example, a Controller Area Network (CAN), Local Interconnect Network (LIN), Ethernet, etc., although other types of communication protocols and/or interfaces may be used.

The present disclosure provides an example of an electric power steering (EPS) system, having dual ECUs, including a first ECU 100 and a second ECU 110. Each of the first ECU 100 and the second ECU 110 is configured to use information from the sensor 120. This is merely an example, and the system and method of the present disclosure may be applied to any number of sensors or any type of control system having two or more ECUs, provided that two of the ECUs are connected to a shared sensor or other data source.

In some embodiments, the sensor 120 is configured to communicate with the first ECU 100 and/or the second ECU 110 using a point-to-point communications interface. In some embodiments, the point-to-point communications interface includes a voltage interface that transmits data based on changes in voltage. In some embodiments, the point-to-point communications interface includes an asynchronous voltage interface, such as the Single Edge Nibble Transmission (SENT) protocol described in SAE International standard J2716. However, other communications interfaces and/or protocols may be used.

Figure 3:
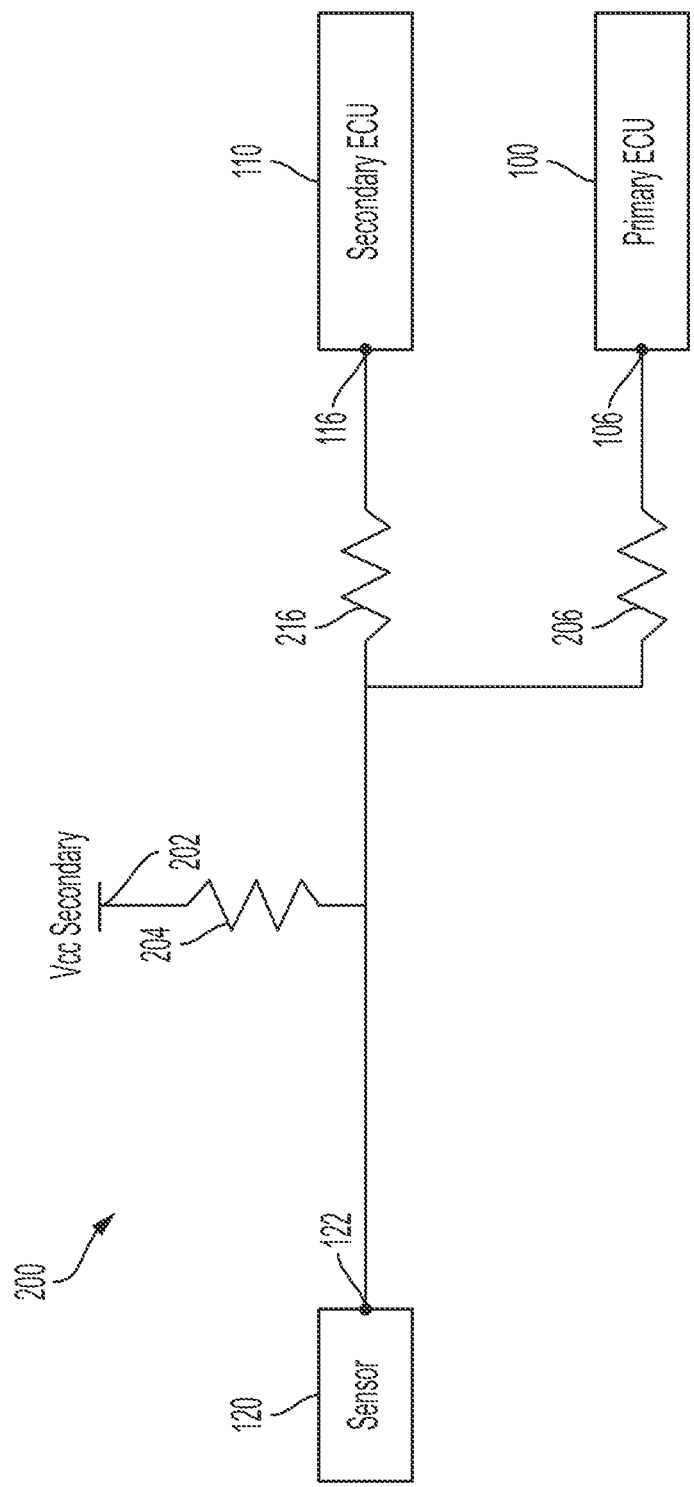
FIG. 3 generally illustrates a schematic wiring diagram between two ECUs and a sensor, according to the principles of the present disclosure.

FIG. 3 shows a schematic wiring diagram 200 between the first ECU 100, the second ECU 110, and the sensor 120. A sensor power rail 202 has a voltage, Vcc secondary, and is powered by the second ECU 110. The sensor 120 has a sensor input/output (I/O) terminal 122 that is connected to the sensor power rail 202 through a pull-up resistor 204 that pulls the sensor I/O terminal 122 to the Vcc secondary voltage provided by the second ECU 110. The sensor I/O terminal 122 is also connected to a first communications terminal 106 of the first ECU 100 via a first current limiting resistor 206. The pulled-up voltage of the sensor I/O terminal 122 may be registered by the first ECU 100 as a logic level high condition upon the first communications terminal 106. The sensor I/O terminal 122 is also connected to a second communications terminal 116 of the second ECU 110 via a second current limiting resistor 216. The pulled-up voltage of the sensor I/O terminal 122 may be registered by the second ECU 110 as a logic level high condition upon the second communications terminal 116.

The first communications terminal 106 of the first ECU 100 may include input hardware configured for read-only communications. In other words, the first communications terminal 106 of the first ECU 100 may be configured as an input device that only reads or measures signals thereupon and which is not capable of writing or changing the value of voltage or other signal thereupon. Alternatively, the first communications terminal 106 of the first ECU 100 may include input/output hardware configured for bidirectional communications.

The second ECU 110 may include input/output hardware connected to the second communications terminal 116 to provide bidirectional communications thereupon. In other words, the second ECU 110 may be configured to both read from and write to the second communications terminal 116. For example, the second ECU 110 may read a voltage level on the second communications terminal 116 and also adjust the voltage level on the second communications terminal 116. The second ECU 110 may include one or more switching devices, such as transistors, configured to selectively connect the second communications terminal 116 to a ground or reference voltage in order to reduce or pull-down a voltage on the second communications terminal 116. This changing voltage on the second communications terminal 116 may be received by the sensor 120 as a change in voltage on its sensor I/O terminal 122. This is merely an example, and other types of signaling may be used.

The sensor 120 may include input/output hardware connected to the sensor I/O terminal 122 to provide bidirectional communications thereupon. In other words, the sensor 120 may be configured to both read signals from the sensor I/O terminal 122 and to change an electrical status of the sensor I/O terminal 122 to write data thereto. For example, the sensor 120 may include one or more switching devices configured to selectively connect the sensor I/O terminal 122 to a ground or reference voltage in order to reduce or pull-down a voltage on the sensor I/O terminal 122.

The sensor signal on the sensor I/O terminal 122 will be pulled to high as long as Vcc secondary stays high. When the sensor 120 communicates, it pulls the sensor I/O terminal 122 low, thereby creating a toggling pattern on the sensor I/O terminal 122. The pulled-low voltage of the sensor I/O terminal 122 may be registered by the first ECU 100 as a logic level low condition upon the first communications terminal 106. The pulled-low voltage of the sensor I/O terminal 122 may also be registered by the second ECU 110 as a logic level low condition upon the second communications terminal 116.

When the second ECU 110 is ON, Vcc secondary will keep the signal high on first communications terminal 106 of the first ECU 100. The first communications terminal 106 of the first ECU 100 will read high or toggling status. When the second ECU 110 is OFF, Vcc secondary will also be OFF. The first communications terminal 106 of the first ECU 100 will be maintained at a logic level low condition, which the first ECU 100 may interpret to determine the OFF status of the second ECU 110.

Figure 4:
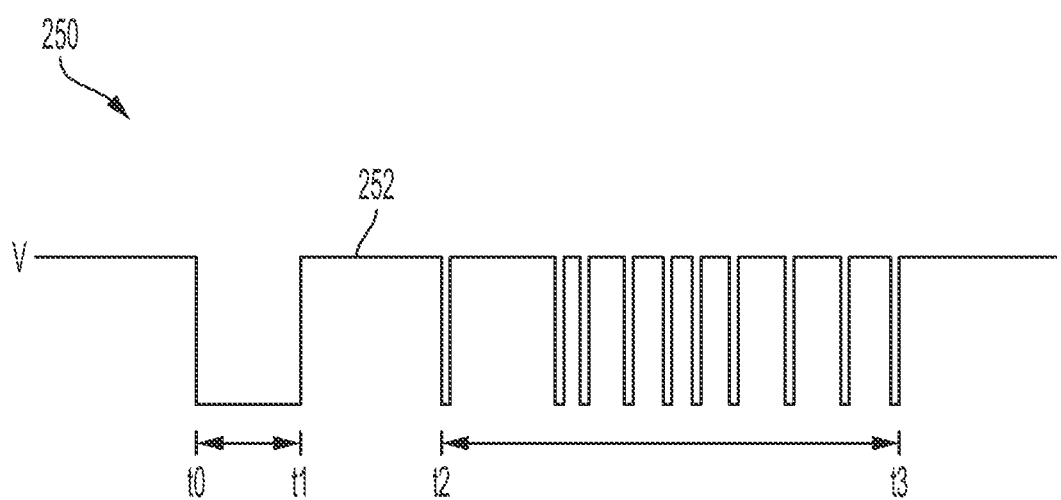
FIG. 4 shows a graph of voltage over time on a communications line between a sensor and an ECU, according to the principles of the present disclosure.

FIG. 4 shows a graph 250 including a plot 252 of voltage over time on a communications line between the sensor 122 and the second ECU 110. This may be, for example, a voltage of the sensor I/O terminal 122.

The plot 252 shows a long pulse between time t0 and time t1 where the voltage on the communications line drops to a low-voltage state. This long pulse may be generated by the second ECU 110 and may represent a command to the sensor 120, requesting the sensor 120 to provide data. Subsequently and between time t2 and time t3, the plot 252 shows a series of shorter pulses of low-voltage, with varying time between the pulses. These pulses between times t2 and t3 represent digital data communicated from the sensor 120 via its sensor I/O terminal 122.

The first ECU 100 may be configured to monitor the communications line between the sensor 122 and the second ECU 110 and to determine the status of the second ECU 110. Alternatively or additionally, the first ECU 100 may be configured to monitor data transmitted by the sensor 120 in order to independently monitor the sensor data therefrom.

The second ECU 110 may be configured to transmit the command (i.e. the long pulse) to the sensor 120 on a regular basis. If the first ECU 100 does not detect the command (i.e. the long pulse) for a predetermined period of time, the first ECU 110 may determine that the second ECU 110 is faulty. The first ECU 100 may use a logic level of the first communications terminal 106 to determine a status of the second ECU 110. The first ECU 100 may interpret the first communications terminal 106 in a maintained logic level low condition (e.g. a voltage below a predetermined value) to determine the second ECU 110 in an OFF condition. Similarly, the first ECU 100 may interpret the first communications terminal 106 in a maintained logic level high condition (e.g. a voltage above a predetermined value) to determine the second ECU 110 in an ON condition.

Figure 5:
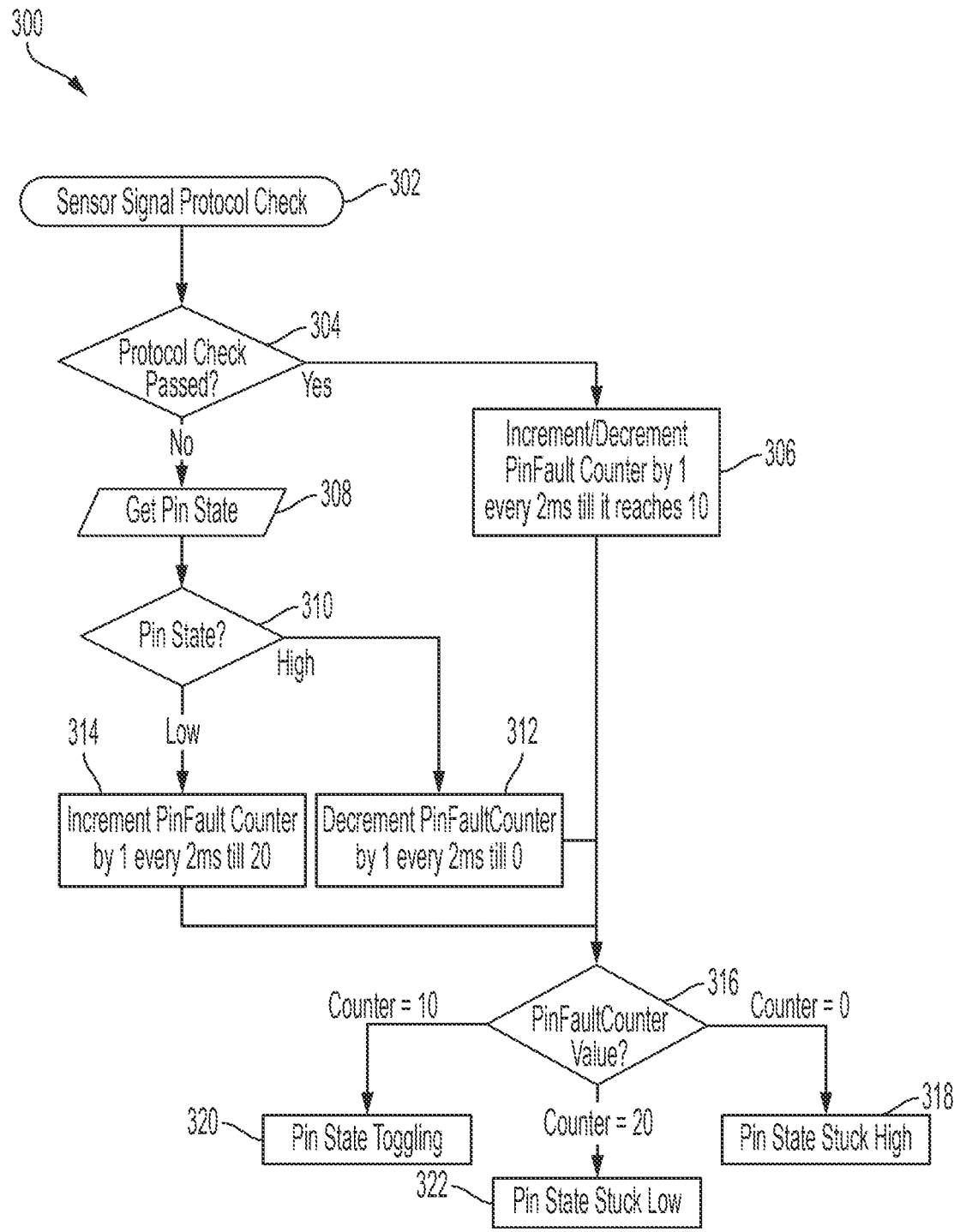
FIG. 5 is a flow diagram generally illustrating a first method of determining ECU status in an dual-ECU system, according to principles of the present disclosure.

FIG. 5 is a flow diagram generally illustrating a first method 300 of determining ECU status in an dual-ECU system. The first method 300 may be implemented in software, such as a program run by the first ECU 100. At 302, the first method 300 checks sensor signal protocol data. For example, the first processor 102 may check the status of data received on the first communications terminal 106 connected to the sensor 120.

At 304, the first method 300 determines if the protocol check passed. For example, the first processor 102 may determine if the sensor signal data is valid. This step 304 may include, for example, checking parity of the sensor data, using a cyclic redundancy check (CRC), or any other technique to verify protocol data. If the sensor signal is determined to be valid, the method 400 proceeds to 306; if the sensor signal is determined to be not valid, the first method 300 proceeds to 308.

At 306, the first method 300 increments or decrements a pin fault counter by 1 every 2 ms (milliseconds) until the pin fault counter reaches ten (10). Upon the pin fault counter reaching ten, the first method 300 proceeds to 316. It should be appreciated that 2 ms is example, and step 306 may include incrementing or decrementing the pin fault counter by a different value and/or at a different rate.

At 308, the first method 300 gets the pin state. For example, the first processor 102 may determine whether the first communications terminal 106 connected to the sensor 120 is at a high logic level or a low logic level.

At 310, the first method 300 makes a determination based on the pin state. The first method 300 proceeds to step 312 in response to determining the pin (e.g. the first communications terminal 106) having a logic level high condition. The first method 300 proceeds to step 314 in response to determining the pin (e.g. the first communications terminal 106) having a logic level low condition.

At 312, the first method 300 decrements the pin fault counter by 1 every 2 ms (milliseconds) until the pin fault counter reaches zero (0). Upon the pin fault counter reaching zero, the first method 300 proceeds to 316. It should be appreciated that 2 ms is example, and step 312 may include decrementing the pin fault counter by a different value and/or at a different rate.

At 314, the first method 300 increments the pin fault counter by 1 every 2 ms (milliseconds) until the pin fault counter reaches twenty (20). Upon the pin fault counter reaching twenty, the first method 300 proceeds to 316. It should be appreciated that 2 ms is example, and step 314 may include incrementing the pin fault counter by a different value and/or at a different rate.

At 316, the first method 300 makes a decision based on the value of the pin fault counter. In response to determining the pin fault counter having a value of zero (0), the first method 300 proceeds to 318. In response to determining the pin fault counter having a value of ten (10), the first method 300 proceeds to 320. In response to determining the pin fault counter having a value of twenty (20), the first method 300 proceeds to 322.

At 318, the first method 300 determines that the pin (e.g. the first communications terminal 106) is stuck at the logic level high condition. Thus, the first method 300 may make a determination that the second ECU 110 is powered on but not working.

At 320, the first method 300 determines that the pin (e.g. the first communications terminal 106) is toggling between the logic level high and the logic level low conditions. Thus, the first method 300 may make a determination that the second ECU 110 is powered on and is working.

At 322, the first method 300 determines that the pin (e.g. the first communications terminal 106) is stuck at the logic level low condition. Thus, the first method 300 may make a determination that the second ECU 110 is powered off.

The software components that read from this sensor, utilize in-built protocol checks to indicate if the sensor signals are valid. As long as valid signals are read by the first ECU 100, the Sensor Signal Protocol Check will pass. This indicates that sensor and second ECU both are communicating.

When the protocol check fails on the first ECU 100, it indicates sensor signals are not received as expected. In this case, the logic level of the pin is read on the first ECU 100. If it stays at a logic level high or low for more than a threshold timer (20 ms CBE), the Pin State will be set to 'stuck high' or 'stuck low', respectively. This Pin State can be used to determine the state of health of the second ECU 110. The threshold timer may have any suitable value, and 20 ms is merely one example.

The correlation shown in Table 1, below, can be established between Pin State and ECU State based on the protocol signatures of the sensor signal. This correlation forms the basis of determining a state of health of the second ECU 110.

TABLE 1

| Sensor Signal Pin State on First ECU 100 | Second ECU 110 State |
| --- | --- |
| Pin State Stuck High | ECU is powered on but not working |
| Pin State Stuck Low | ECU is off |
| Pin State Toggling (Protocol check passed) | ECU is on and working |

All the above logic is independent of the IMC signals and status of the IMC communication channels. Hence it can be used to determine the state of health of the second ECU 110, even in the presence of an IMC fault.

The system and method of the present disclosure may use a shared sensor signal from the sensor 120, which may include a torque sensor in an electric power steering system. Alternatively or additionally, the system and method of the present disclosure may use other kinds of shared sensors/protocols to determine the second ECU 110 state of health. The system and method of the present disclosure may utilize existing hardware, with minor software updates to determine the state of health of the second ECU 110, independent of IMC status.

According to an aspect of the disclosure, an alternative method to find the state of health of an ECU, even in case of IMC failure, would be to route battery voltage signals of one ECU to the other ECU to check the status of the ECU by monitoring the battery voltage signal. However, this may require extra hardware and/or changes to existing system hardware.

Figure 6:
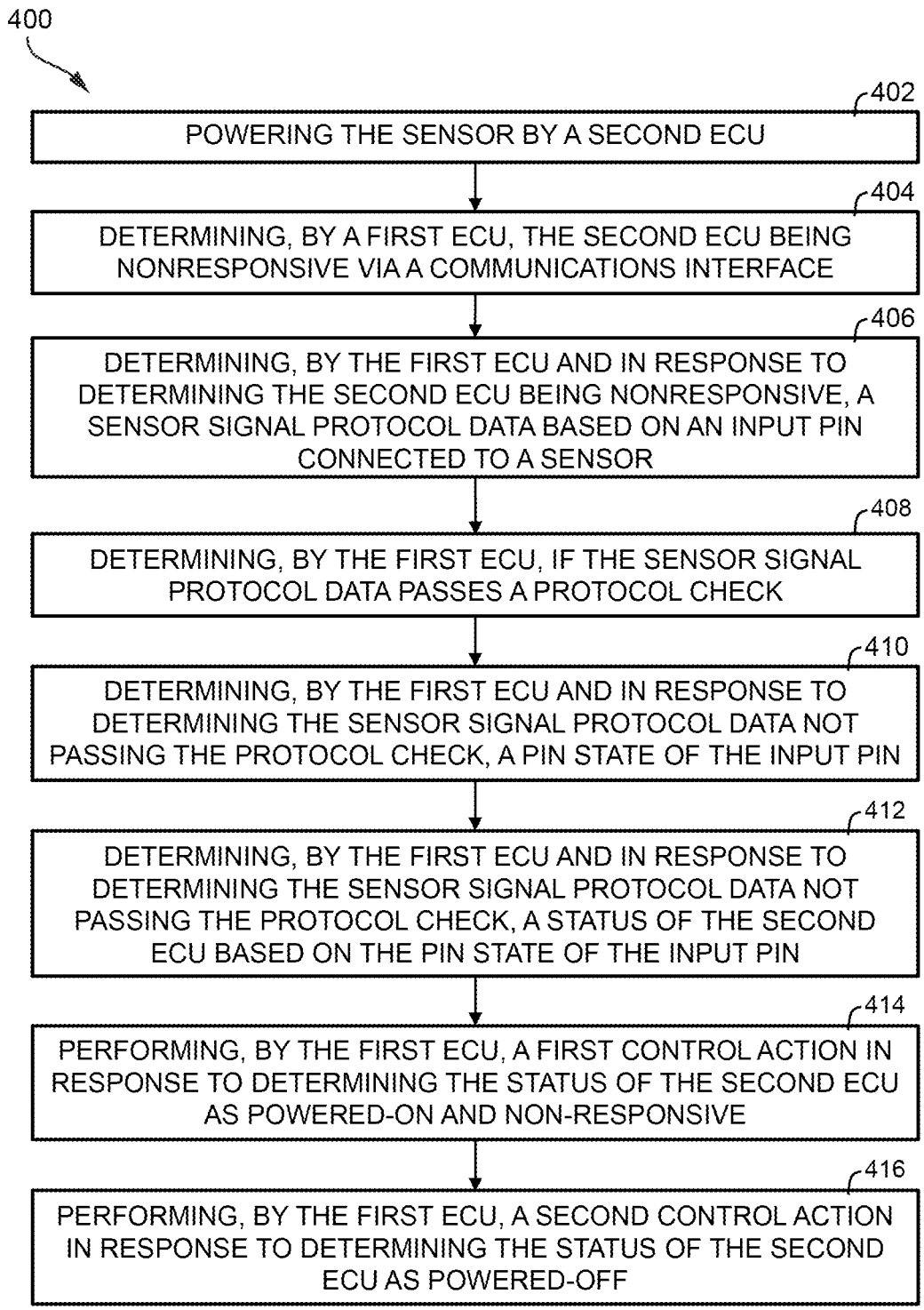
FIG. 6 is a flow diagram generally illustrating a second method of determining ECU status in an dual-ECU system, according to principles of the present disclosure.

FIG. 6 is a flow diagram generally illustrating a second method 400 of determining ECU status in an dual-ECU system. The first method 400 may be implemented in software, such as a program run by the first ECU 100. At 402, the first method 400 powers a sensor by a second ECU. For example, the second ECU 110 may provide electrical power to the sensor 120 via the sensor power rail 202.

At 404, the first method 400 determines, by a first ECU, the second ECU being nonresponsive via a communications interface.

At 406, the first method 400 determines, by the first ECU and in response to determining the second ECU being nonresponsive, a sensor signal protocol data based on an communications terminal connected to a sensor.

At 408, the first method 400 determines, by the first ECU, if the sensor signal protocol data passes a protocol check.

At 410, the first method 400 determines, by the first ECU and in response to determining the sensor signal protocol data not passing the protocol check, a pin state of the communications terminal.

At 412, the first method 400 determines, by the first ECU and in response to determining the sensor signal protocol data not passing the protocol check, a status of the second ECU based on the pin state of the communications terminal. The pin state may include at least one of: the communications terminal remaining at a given logic level condition for a predetermined period of time or the communications terminal toggling between a logic level high condition and a logic level low condition by not remaining at a given one of the logic level high condition or the logic level low condition for the predetermined period of time.

In some embodiments, determining the status of the second ECU at step 412 includes determining the status of the second ECU as powered-on and functioning in response to determining the pin state of the communications terminal toggling between the logic level high condition and the logic level low condition.

In some embodiments, determining the status of the second ECU at step 412 includes determining the status of the second ECU includes determining the status of the second ECU as powered-on and non-responsive in response to determining the pin state of the communications terminal remaining at the logic level high condition for a first predetermined period of time.

In some embodiments, each of the first ECU and the second ECU are configured to communicate with the sensor using a Single Edge Nibble Transmission (SENT) protocol.

In some embodiments, determining the status of the second ECU at step 412 includes determining the status of the second ECU includes determining the status of the second ECU as powered-off in response to determining the pin state of the communications terminal remaining at the logic level low condition for a second predetermined period of time.

At 414, the first method 400 performs, by the first ECU, a first control action in response to determining the status of the second ECU as powered-on and non-responsive, the first control action including, at least, initializing communications with the sensor.

At 416, the first method 400 performs, by the first ECU, a second control action in response to determining the status of the second ECU as powered-off, wherein the second control action includes, at least, providing power to the sensor and initializing communications with the sensor.

According to an aspect of the disclosure, a method of determining status of an electronic control unit (ECU) in a dual-ECU system is provided. The method includes: determining, by a first ECU, a pin state of an communications terminal connected to a sensor; powering the sensor by a second ECU; and determining, by the first ECU, a status of the second ECU based on the pin state of the communications terminal.

In some embodiments, the method may further include: determining, by the first ECU, the second ECU being nonresponsive via a communications interface. The step of determining the status of the second ECU may be performed in response to determining the second ECU being nonresponsive via the communications interface.

In some embodiments, the method may further include: determining the status of the second ECU based on the pin state of the communications terminal remaining at a given logic level condition for a predetermined period of time.

In some embodiments, the method may further include: verifying a sensor signal protocol data based on the pin state of the communications terminal; and determining, by the first ECU, if the sensor signal protocol data passes a protocol check. The step of determining the status of the second ECU may depend on the sensor signal protocol data passing the protocol check.

In some embodiments, the method may further include: determining, by the first ECU, the pin state of the communications terminal toggling between a logic level high condition and a logic level low condition by not remaining at a given one of the logic level high condition or the logic level low condition for a predetermined period of time; and determining, by the first ECU, the status of the second ECU as powered-on and functioning in response to determining the pin state of the communications terminal toggling between the logic level high condition and the logic level low condition.

In some embodiments, the method may further include: determining, by the first ECU, the pin state of the communications terminal remaining at a logic level high condition for a first predetermined period of time; and determining, by the first ECU, the status of the second ECU as powered-on and non-responsive in response to determining the pin state of the communications terminal remaining at the logic level high condition for the first predetermined period of time.

In some embodiments, the method may further include: performing, by the first ECU, a first control action in response to determining the status of the second ECU as powered-on and non-responsive, the first control action including, at least, initializing communications with the sensor.

In some embodiments, the method may further include: determining, by the first ECU, the pin state of the communications terminal remaining at a logic level low condition for a second predetermined period of time; and determining, by the first ECU, the status of the second ECU as powered-off in response to determining the pin state of the communications terminal remaining at the logic level low condition for the second predetermined period of time.

In some embodiments, the method may further include: performing, by the first ECU, a second control action in response to determining the status of the second ECU as powered-off.

In some embodiments, the second control action may include, at least, providing power to the sensor and initializing communications with the sensor.

According to an aspect of the disclosure, a method of determining status of an electronic control unit (ECU) in a dual-ECU system is provided. The method includes: powering a sensor by a second ECU; determining, by a first ECU, the second ECU being nonresponsive via a communications interface; determining, by the first ECU and in response to determining the second ECU being nonresponsive, a sensor signal protocol data based on an communications terminal connected to a sensor; determining, by the first ECU, if the sensor signal protocol data passes a protocol check; determining, by the first ECU and in response to determining the sensor signal protocol data not passing the protocol check, a pin state of the communications terminal; determining, by the first ECU and in response to determining the sensor signal protocol data not passing the protocol check, a status of the second ECU based on the pin state of the communications terminal. The pin state may include at least one of the communications terminal remaining at a given logic level condition for a predetermined period of time or the communications terminal toggling between a logic level high condition and a logic level low condition by not remaining at a given one of the logic level high condition or the logic level low condition for the predetermined period of time. The step of determining the status of the second ECU includes determining the status of the second ECU as powered-on and functioning in response to determining the pin state of the communications terminal toggling between the logic level high condition and the logic level low condition. The step of determining the status of the second ECU includes determining the status of the second ECU as powered-on and non-responsive in response to determining the pin state of the communications terminal remaining at the logic level high condition for a first predetermined period of time. Each of the first ECU and the second ECU may be configured to communicate with the sensor using a Single Edge Nibble Transmission (SENT) protocol. The step of determining the status of the second ECU includes determining the status of the second ECU as powered-off in response to determining the pin state of the communications terminal remaining at the logic level low condition for a second predetermined period of time. The method may further include performing, by the first ECU, a first control action in response to determining the status of the second ECU as powered-on and non-responsive, the first control action including, at least, initializing communications with the sensor; and performing, by the first ECU, a second control action in response to determining the status of the second ECU as powered-off, wherein the second control action includes, at least, providing power to the sensor and initializing communications with the sensor.

According to an aspect of the disclosure, a system for determining status of an electronic control unit (ECU) in a dual-ECU system is provided. The system includes: a sensor having a sensor output pin; a first ECU having a first communications terminal in electrical communication with the sensor output pin, the first ECU being configured to read sensor data from the sensor based on a pin state of the first communications terminal; and a second ECU having a second communications terminal in electrical communication with the sensor output pin, the second ECU being configured to read the sensor data from the sensor based on a pin state of the second communications terminal, the second ECU providing power to a sensor power rail and biasing a voltage of the first communications terminal and the second communications terminal to a logic level high condition. The first ECU is configured to determine a status of the second ECU based on the pin state of the first communications terminal.

In some embodiments, the system may further include: a communications interface between the first ECU and the second ECU and providing communications therebetween. The first ECU may be configured to determine the status of the second ECU in response to determining the second ECU being nonresponsive via the communications interface.

In some embodiments, the first ECU may be configured to determine the status of the second ECU based on the pin state of the first communications terminal remaining at a given logic level condition for a predetermined period of time.

In some embodiments, each of the first ECU and the second ECU may be configured to communicate with the sensor using a Single Edge Nibble Transmission (SENT) protocol.

In some embodiments, the first ECU may be configured to determine the pin state of the first communications terminal toggling between a logic level high condition and a logic level low condition by not remaining at a given one of the logic level high condition or the logic level low condition for a predetermined period of time. The first ECU may be configured to determine the status of the second ECU as powered-on and functioning in response to determining the pin state of the first communications terminal toggling between the logic level high condition and the logic level low condition.

In some embodiments, the first ECU may be configured to determine the pin state of the first communications terminal remaining at a logic level high condition for a first predetermined period of time. The first ECU may be configured to determine the status of the second ECU as powered-on and non-responsive in response to determining the pin state of the first communications terminal remaining at the logic level high condition for the first predetermined period of time.

In some embodiments, the first ECU may be configured to perform a first control action in response to determining the status of the second ECU as powered-on and non-responsive, the first control action including, at least, initializing communications with the sensor.

In some embodiments, the first ECU may be configured to determine the pin state of the first communications terminal remaining at a logic level low condition for a second predetermined period of time. The first ECU may be configured to determine the status of the second ECU as powered-off in response to determining the pin state of the first communications terminal remaining at the logic level low condition for the second predetermined period of time.

In some embodiments, the first ECU is configured may be perform a second control action in response to determining the status of the second ECU as powered-off. The second control action may include, at least, providing power to the sensor and initializing communications with the sensor.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method of determining status of an electronic control unit (ECU) in a dual-ECU system, comprising:
providing a first ECU having a first communications terminal in electrical communications with a sensor and having a pin state representing data from the sensor;
reading, by the first ECU, the data from the sensor based on the pin state of the first communications terminal;
reading, by a second ECU, the data from the sensor via a second communications terminal in electrical communications with the sensor;
powering the sensor by the second ECU, thereby biasing a voltage of the first communications terminal and the second communications terminal to a logic level high condition; and
determining, by the first ECU, a status of the second ECU based on the pin state of the first communications terminal, and
wherein the sensor is physically independent of each of the first ECU and the second ECU.

2. The method of claim 1, further comprising:
determining, by the first ECU, the second ECU being nonresponsive via a communications interface, wherein the communications interface is independent of the first communications terminal, and
wherein the determining the status of the second ECU is performed in response to determining the second ECU being nonresponsive via the communications interface.

3. The method of claim 1, wherein the pin state representing data from the sensor includes at least one of a logic level high condition and a logic level low condition, and
wherein the method further comprises: determining the status of the second ECU based on the pin state of the first communications terminal remaining at a given one of the logic level high condition or the logic level low condition and for a predetermined period of time.

4. The method of claim 1, further comprising:
verifying a sensor signal protocol data based on the pin state of the first communications terminal; and
determining, by the first ECU, if the sensor signal protocol data passes a protocol check,
wherein determining the status of the second ECU depends on the sensor signal protocol data not passing the protocol check.

5. The method of claim 1, further comprising:
determining, by the first ECU, the pin state of the first communications terminal toggling between a logic level high condition and a logic level low condition by not remaining at a given one of the logic level high condition or the logic level low condition for a predetermined period of time; and
determining, by the first ECU, the status of the second ECU as powered-on and functioning in response to determining the pin state of the first communications terminal toggling between the logic level high condition and the logic level low condition.

6. The method of claim 1, further comprising:
determining, by the first ECU, the pin state of the first communications terminal remaining at a logic level high condition for a first predetermined period of time; and
determining, by the first ECU, the status of the second ECU as powered-on and non-responsive in response to determining the pin state of the first communications terminal remaining at the logic level high condition for the first predetermined period of time.

7. The method of claim 6, further comprising: performing, by the first ECU, a first control action in response to determining the status of the second ECU as powered-on and non-responsive, the first control action including, at least, initializing communications with the sensor.

8. The method of claim 1, further comprising:
determining, by the first ECU, the pin state of the first communications terminal remaining at a logic level low condition for a second predetermined period of time; and
determining, by the first ECU, the status of the second ECU as powered-off in response to determining the pin state of the first communications terminal remaining at the logic level low condition for the second predetermined period of time.

9. The method of claim 8, further comprising: performing, by the first ECU, a second control action in response to determining the status of the second ECU as powered-off.

10. The method of claim 9, wherein the second control action includes, at least, providing power to the sensor and initializing communications with the sensor.

11. A method of determining status of an electronic control unit (ECU) in a dual-ECU system having a first ECU and a second ECU, comprising:
   reading, by the first ECU, sensor data from a sensor via a first communications terminal in electrical communications with the sensor;
   reading, by the second ECU, the sensor data from the sensor via a second communications terminal in electrical communications with the sensor;
   powering the sensor by the second ECU, thereby biasing a voltage of each of the first communications terminal and the second communications terminal to a logic level high condition, wherein the sensor is physically independent of each of the first ECU and the second ECU;
   determining, by the first ECU, the second ECU being nonresponsive via a communications interface, wherein the communications interface is independent of each the first communications terminal and the second communications terminal;
   determining, by the first ECU and in response to determining the second ECU being nonresponsive, a sensor signal protocol data based on a pin state of the first communications terminal;
   determining, by the first ECU, if the sensor signal protocol data passes a protocol check;
   determining, by the first ECU and in response to determining the sensor signal protocol data not passing the protocol check, a pin state of the first communications terminal;
   determining, by the first ECU and in response to determining the sensor signal protocol data not passing the protocol check, a status of the second ECU based on the pin state of the first communications terminal, wherein the pin state includes at least one of the first communications terminal remaining at a given logic level condition for a predetermined period of time or the first communications terminal toggling between a logic level high condition and a logic level low condition by not remaining at a given one of the logic level high condition or the logic level low condition for the predetermined period of time,
   wherein determining the status of the second ECU includes determining the status of the second ECU as powered-on and functioning in response to determining the pin state of the first communications terminal toggling between the logic level high condition and the logic level low condition,
   wherein determining the status of the second ECU includes determining the status of the second ECU as powered-on and non-responsive in response to determining the pin state of the first communications terminal remaining at the logic level high condition for a first predetermined period of time,
   wherein each of the first ECU and the second ECU are configured to communicate with the sensor using a Single Edge Nibble Transmission (SENT) protocol;
   wherein determining the status of the second ECU includes determining the status of the second ECU as powered-off in response to determining the pin state of the first communications terminal remaining at the logic level low condition for a second predetermined period of time;
   performing, by the first ECU, a first control action in response to determining the status of the second ECU as powered-on and non-responsive, the first control action including, at least, initializing communications with the sensor; and
   performing, by the first ECU, a second control action in response to determining the status of the second ECU as powered-off, wherein the second control action includes, at least, providing power to the sensor and initializing communications with the sensor.

12. A system for determining status of an electronic control unit (ECU) in a dual-ECU system, comprising:
   a sensor having a sensor output pin;
   a first ECU having a first communications terminal in electrical communication with the sensor output pin and having a pin state representing sensor data from the sensor, the first ECU being configured to read the sensor data from the sensor based on the pin state of the first communications terminal; and
   a second ECU having a second communications terminal in electrical communication with the sensor output pin, the second ECU being configured to read the sensor data from the sensor based on a pin state of the second communications terminal, the second ECU providing power to a sensor power rail and biasing a voltage of the first communications terminal and the second communications terminal to a logic level high condition, and
   wherein the first ECU is configured to determine a status of the second ECU based on the pin state of the first communications terminal.

13. The system of claim 12, further comprising: a communications interface between the first ECU and the second ECU and providing communications therebetween, and
   wherein the first ECU is configured to determine the status of the second ECU in response to determining the second ECU being nonresponsive via the communications interface.

14. The system of claim 12, wherein the first ECU is configured to determine the status of the second ECU based on the pin state of the first communications terminal remaining at a given logic level condition for a predetermined period of time.

15. The system of claim 12, wherein each of the first ECU and the second ECU are configured to communicate with the sensor using a Single Edge Nibble Transmission (SENT) protocol.

16. The system of claim 12, wherein the first ECU is configured to determine the pin state of the first communications terminal toggling between a logic level high condition and a logic level low condition by not remaining at a given one of the logic level high condition or the logic level low condition for a predetermined period of time, and
   wherein the first ECU is configured to determine the status of the second ECU as powered-on and functioning in response to determining the pin state of the first communications terminal toggling between the logic level high condition and the logic level low condition.

17. The system of claim 12, wherein the first ECU is configured to determine the pin state of the first communications terminal remaining at a logic level high condition for a first predetermined period of time, and
   wherein the first ECU is configured to determine the status of the second ECU as powered-on and non-responsive in response to determining the pin state of the first communications terminal remaining at the logic level high condition for the first predetermined period of time.

18. The system of claim 17, wherein the first ECU is configured to perform a first control action in response to determining the status of the second ECU as powered-on and non-responsive, the first control action including, at least, initializing communications with the sensor.

19. The system of claim 12, wherein the first ECU is configured to determine the pin state of the first communications terminal remaining at a logic level low condition for a second predetermined period of time, and
   wherein the first ECU is configured to determine the status of the second ECU as powered-off in response to determining the pin state of the first communications terminal remaining at the logic level low condition for the second predetermined period of time.

20. The system of claim 19, wherein the first ECU is configured to perform a second control action in response to determining the status of the second ECU as powered-off, wherein the second control action includes, at least, providing power to the sensor and initializing communications with the sensor.

\* \* \* \* \*